April 15, 1958 A. J. TOTI 2,830,316
DEFEATHERING APPARATUS FOR FOWL
Filed July 10, 1953
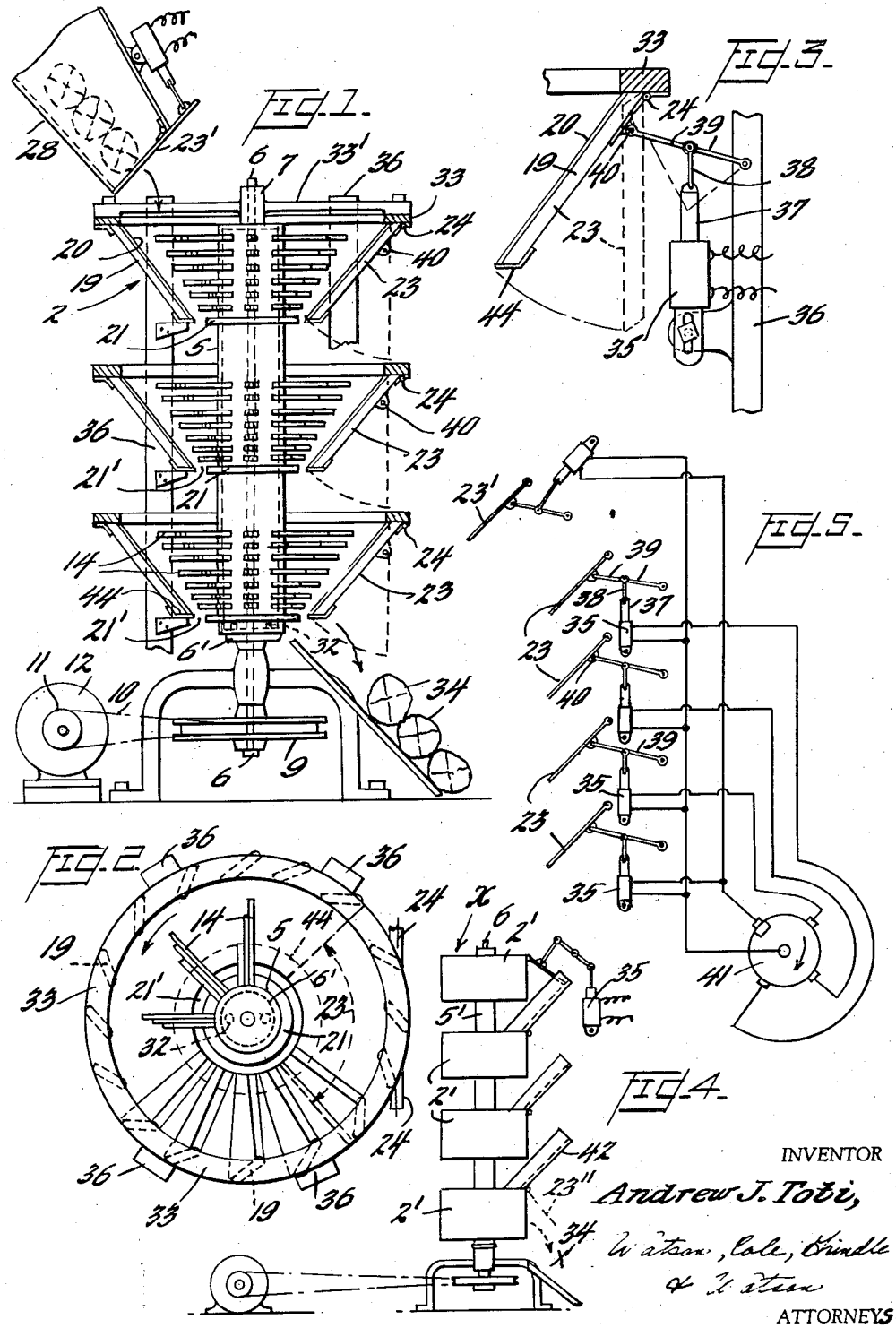
INVENTOR
Andrew J. Toti,
ATTORNEYS

United States Patent Office 2,830,316
Patented Apr. 15, 1958

2,830,316

DEFEATHERING APPARATUS FOR FOWL

Andrew J. Toti, Modesto, Calif., assignor to Honolulu Oil Corporation, a corporation of Delaware Application July 10, 1953, Serial No. 367,244

6 Claims. (Cl. 17—11.1)

This invention relates to apparatus and methods of removing the feathers from fowl and has for its principal object an apparatus which will give better results in a given time, and which will give good control of the travel of fowls through the apparatus. Other features are compactness with low cost of construction and large output. Still other features and advantages of the invention will appear in the following description and accompanying drawings.

In the drawings Fig. 1 is a vertical cross section of one form of machine or apparatus to carry out the invention.

Fig. 2 is a top plan view of Fig. 1.

Fig. 3 is an enlarged detail vertical section of one of the hopper gates of Fig. 1.

Fig. 4 is a diagrammatic sketch of a variation of the machine.

Fig. 5 is a diagram of the electric control of a consecutive hopper discharge gate operating system which may be used.

Briefly described the present apparatus comprises a plurality of picking hoppers similar to the vertical hopper shown in Figs. 4 and 5 of my copending patent application filed on September 7, 1951, under Serial #245,571, now U. S. Patent No. 2,805,443, issued September 10, 1957, or the hopper shown in Figs. 1 and 2 of my copending patent application filed on June 25, 1953, under Serial #364,044, but employs a series of such hoppers arranged one above the other and the fowls pass automatically downward from one hopper to the other and the completely picked fowls emerge from the lowermost hopper or any other one if sufficiently picked. The hoppers preferably are of upwardly flaring form as shown in my latest filed patent above mentioned and to which reference is made for details not shown here, as the present case is more concerned with the superimposed hopper idea and successive discharge of the fowl from one hopper into the next lower one.

As in the latest copending patent application referred to, the hoppers each (in Figs. 1 and 2 of the present drawing) comprise an upwardly flaring wall 2 of preferably spaced slats 19 preferably shod on their inner sides with a strip of vertically surface grooved sheet rubber 20, and supported by suitable framing here indicated as a horizontal top flange 33 and a flange bottom 44, tho the wall may be otherwise formed as mentioned in the copending case as per Figs. 3 and 4 of said case, and each hopper is provided with a side opening gate 23 here shown hinged at the top as by hinges 24 so that the lower end of the gate will swing outwardly as shown dotted in Fig. 3 to permit the fowls in that hopper to fall to the hopper below, and means is provided to open the gates and close them one after the other in succession from the lowermost hopper to the uppermost, then open the supply chute gate to allow more fowls to fall into the top hopper, then repeat the opening of the gates in the succession stated, the time interval of holding the gates open being only long enough for the fowl in the particular hopper to fall into the hopper below.

In the present case the picker drum or cylinder 5 is indicated as sheet metal studded all over outwardly with picker fingers 14 which may be of conventional type or the special ones indicated here, and in my copending patent application entitled "Fowl Picker and Method" filed under Serial #356,654, on May 22, 1953. Note that in Fig. 2 of the drawing, the wall slats 19 and beaters 14 actually extend respectively entirely around the hopper and drum, but only a few are shown for clarity.

The picker drum 5 or cylindrical assemblage of picker elements in the present case is long enough to extend through the several superimposed hoppers and is driven from the lower end of a shaft 6 by a belt 10, pulleys 9 and 11 and electric motor 12, and preferably the drum carries a ring flange 21 adjacent to lower end of each hopper to reduce the width of the annular opening left there to a point insuring against a chicken getting caught in it, but will pass feathers removed from the fowl.

The drum shaft 6 may have a driving disk 6' secured to it and with driving pins 32 projecting upwardly through the lower head of the drum to drive the same, yet permit the drum to be freely lifted out when the upper shaft bearing 7 is lifted off with its supporting cross bar 33.

The fowl X are fed into the upper hopper as from a chute 28 under control of a gate 23' to remain a few seconds in the upper hopper, then dropped to the next below and so on, and to finally emerge from the lower hopper at X34.

The means for automatically opening and closing each gate 23, starting from the lowest one first, may take any of many forms either mechanically or electrically operated by specific means well understood by those skilled in timing apparatus, but is here shown as by a series of electric solenoids 35 of the spring return to normal type, each secured to a suitable fixed or frame member 36 and with its retractible plunger or core 37 pivotally linked at 38 to a pair of toggle links 39—39' in turn pivoted to a lug 40 on the gate so that normally the links of the toggle are pushed a trifle over center by the solenoid return spring (concealed in the solenoid casing) and the gates are firmly locked against outward opening, but upon momentarily energizing the solenoids in succession, their plungers will collapse the toggles, open the gates, and after a time interval close and lock them. The timing should provide for the lower hopper to drop out its contents from 1 to 4 fowls (depending on the size of the hoppers) and close the gate before the hopper gate immediately above is opened and closed, and so on till the upper hopper is empty, whereupon the gate 23' of the feed chute is opened by the same hook up to drop the next charge of fowls X into the upper hopper.

If with a three hopper machine with four fowl in each hopper, the gates take about 2 seconds apiece to open and close—that will take about 8 seconds time to operate the gates and chute before the cycle repeats and thus expose the fowls to about 4½ seconds to the defeathering action in each hopper or from 13 to 14 seconds total, tho four completely picked fowls will drop out of the lower hopper about every 8 or 9 seconds, or about 29 or 30 a minute or over 1700 an hour with one simple machine.

In Fig. 5 the diagram of the electric solenoid gate opening is shown operated by any suitable rotary switch 41 provided with wiping contacts of suitable area to hold the gates open the desired length of time, and which rotary switch may be independently rotated by an electric motor or mechanical drive from the machine drive, as desired, and well understood in the art, tho the drive will be shown if required.

In Fig. 4 a variation in the form of the superimposed hoppers is indicated in which the walls 2' are not flaring, but otherwise the picking hopper and cylinder 5' are constructed as indicated for Figs. 1 and 2, but the side gates 23" open upward and discharge the fowl in one hopper out into a chute 42 leading to the next hopper below. This form of hopper has also found to give very satisfactory results, tho the flaring wall type shown in Fig. 1 accommodates various sizes of fowl better. The automatic operation of the gates for the design shown in Fig. 4 could be the same as indicated for Fig. 3 by the solenoid 35 sketched in place at the upper right side of Fig. 4.

In both designs the lowest hopper gate and the feeding chute gate may be opened at the same time if desired.

Having thus described my improvements in a defeathering apparatus for fowls, and some of the possible variations, what I claim is:

1. A fowl defeathering machine comprising a plurality of loose fowl receiving and holding hoppers arranged one above the other, means so supporting the hoppers, said hoppers each being of a size adapted to hold a plurality of loose fowl free for tumbling about therein, rotary feather picking means within the hoppers adapted to engage the loose fowl, means for simultaneously rotating the picking means of all of the hoppers, and means adapted for successively dropping the fowls downwardly from one hopper to another during the operation of the machine and out of the lowest hopper.

2. A fowl picking machine comprising a plurality of loose fowl receiving hoppers of a size each adapted to receive and hold a plurality of fowls free for tumbling about therein to be picked, means supporting said hoppers arranged one above the other, rotary feather picking means within each of the hoppers comprising an assemblage of flexible resilient frictional defeathering fingers and means for rotating the picking means, gate means on each hopper arranged and adapted when open to discharge the fowls to the hopper below, and means adapted for operating said gate means.

3. A fowl picking machine comprising a plurality of loose fowl receiving hoppers of a size each adapted to receive and hold a plurality of fowls free for tumbling about therein to be picked, means supporting said hoppers arranged one above the other, rotary feather picking means within each of the hoppers comprising an assemblage of flexible resilient frictional defeathering fingers and means for rotating the picking means, gate means on each hopper arranged and adapted when open to discharge the fowls to the hopper below, and means for automatically operating said gate means of the various hoppers at predetermined time intervals.

4. In a structure as set out in claim 3, a fowl feeding chute leading to the uppermost hopper provided with a normally closed gate, and the means for automatically operating the hopper gates also operatively connected to operate the feeding chute gate, all in sequence to provide a predetermined time interval of picking in each hopper.

5. Apparatus for defeathering free loose fowl comprising means forming a series of substantially circular hoppers one above the other each of a size to receive and hold a batch of free loose fowl, rotary means positioned within each hopper adapted for mechanically frictionally striking and defeathering the fowl and tumbling the loose fowl about in every direction while urging the fowl bodily about in the hopper, means associated with said hoppers for effecting gravity discharge of the batch of fowls from the higher to the next lower hopper, and means adapted for retaining the batch of fowls successively in each hopper for a predetermined time period for defeathering treatment before discharging.

6. Apparatus for defeathering free loose fowl comprising means forming a series of substantially circular hoppers one above the other each of a size to receive and hold batch of free loose fowl, rotary means positioned within each hopper adapted for mechanically frictionally striking and defeathering the fowl and tumbling the loose fowl about in every direction while urging the fowl bodily about in the hopper, means associated with said hoppers for effecting gravity discharge of the batch of fowls from the higher to the next lower hopper, means positioned adjacent the uppermost hopper automatically introducing successive batches of loose fowls to the uppermost hopper, and means connected with said gravity discharge means automatically retaining the batches of fowls successively in each hopper for a predetermined time period for defeathering treatment before discharging.

References Cited in the file of this patent

UNITED STATES PATENTS

| 385,036 | Ash | June 26, 1888 |
| 456,077 | Bartholomew | July 14, 1891 |
| 745,658 | Perry et al. | Dec. 1, 1903 |
| 2,376,120 | Campbell et al. | May 15, 1945 |
| 2,469,953 | Davis | May 10, 1949 |
| 2,472,468 | Digby | June 7, 1949 |
| 2,596,443 | Sharp | May 13, 1952 |

FOREIGN PATENTS

| 2,920 | Great Britain | 1882 |
| 362,659 | Germany | Oct. 31, 1922 |